United States Patent [19]

Sigouin

[11] Patent Number: 4,582,104
[45] Date of Patent: Apr. 15, 1986

[54] TREE PROCESSING UNIT

[76] Inventor: Roger Sigouin, 601 R. 111 Ouest, Amos, Quebec, Canada

[21] Appl. No.: 620,334

[22] Filed: Jun. 13, 1984

[51] Int. Cl.$^4$ .......................... A01G 23/08; B27C 9/00
[52] U.S. Cl. .................................... 144/2 Z; 144/343; 191/12 R; 414/718
[58] Field of Search ............. 191/12 R; 144/2 Z, 3.0, 144/338, 343; 414/718, 686

[56] References Cited

U.S. PATENT DOCUMENTS

| 4,093,047 | 6/1978 | Wampfler | 191/12 R |
| 4,219,057 | 8/1980 | Falk | 144/2 Z |
| 4,276,918 | 7/1981 | Sigouin | |
| 4,413,661 | 11/1983 | Marchildon | 144/2 Z |
| 4,428,407 | 1/1984 | Bourbeau | 144/2 Z |

Primary Examiner—W. D. Bray
Attorney, Agent, or Firm—Robic, Robic & Associates

[57] ABSTRACT

A tree processing unit for use in combination with a motorized carrier. The unit comprises a base support pivotably mounted on and extending up from the carrier, which comprises a pair of spaced apart side plates parallel to each other and defining a through passage between them. An elongated, tubular base is fastened to the upper ends of the side plates of the base support. This base extends above the through passage defined by the side plates. A rigid, elongated boom is movably mounted through the base and has a front end on which is fixed a tree processing head for gripping and debranching a felled tree. Means are fixed onto the base in front of the support and through passage therefrom for holding the processed tree. In operation, the felled tree which is usually picked up by the head, then pulled by the boom to the holding means, and subsequently processed by the head moved forwards by the boom while the tree is held by the holding means, may be repositioned with respect to the holding means by using the head to push the tree back through the passage in the support. This makes it possible to process trees even if their length is longer than the boom.

11 Claims, 4 Drawing Figures ered on May 29, 1979. This unit employs a base and a
TREE PROCESSING UNIT The present invention relates to improvements in tree processing units.

The invention more particularly relates, in one embodiment, to an improved tree processing unit capable of handling trees longer than the operating length of the unit.

In another embodiment, the invention more particularly relates to an improved tree processing unit having means for use in electrically operating at least a portion of the unit.

Tree processing units for handling, debranching, and topping-off trees are known. The units are adapted to be mounted on tracked carrier vehicles such as excavators from which part, or all, of the shovel and boom assembly have been removed or modified. Such units provide relatively inexpensive forest harvesters since existing tracked, carrier equipment can be utilized with the processing unit. One example of such a processing unit is shown in Applicant's Canadian Pat. No. 1,055,366, issued on May 29, 1979. This unit employs a base and a boom movable through the base. The base is used to mount the unit on a modified carrier vehicle and has means for selectively holding a tree. The boom has an operational head at its front end with means thereon for gripping and debranching a tree and for cutting off the top end of a tree. The boom is used to position a tree in the base holding means. When the tree is held in the base, the boom is moved relative to the base, and the held tree, to debranch the tree with the debranching means carried at the front end of the boom.

The known processing units work satisfactorily. However, they are unable to handle trees which are longer than the operating length of the boom. The operating length is generally equal to the distance between the holding means on the base and the gripping means on the front end of the boom when the boom is fully extended forwardly of the base.

Another problem with the known processing units is that of transmitting power from the base to the operational head at the front end of the boom. Since the boom moves back and forth relative to the base, the power lines must be long enough to reach the front end of the boom at its gratest extension from the base. As the front end of boom is moved back toward the base, the power lines must be properly handled to avoid entangling them in the unit or in the trees being processed. Usually, the power lines are arranged in a bundle and the bundle of lines are suspended in loops by movable hangers from a cable suspended above the boom and base, along the length of the boom. Since the operating head at the front end of the boom performs several different functions, several sets of power lines must be grouped into the bundle making the bundle bulky and thus awkward to handle.

A first object of the present invention is to provide an improved tree processing unit including means for permitting the unit to handle trees longer than the operational length of the boom.

Another object of the present invention is to provide an improved tree processing unit including novel means for conducting electrical power to the operating head of the boom.

In accordance with the first object of the present invention, there is provided an improved tree processing unit for use in combination with a motorized carrier. This unit comprises:

a base support pivotably mounted on and extending up from the carrier, this support comprising a pair of spaced apart side plates parallel to each other, then side plates defining a through passage between them;

an elongated, tubular base fastened to the upper ends of the side plates of the base support, this base extending above the through passage defined by the side plates, a rigid, elongated boom movable through the base, this boom having a front end, a tree processing head fixed onto the front end of the boom for gripping and debranching a felled free, and means fixed onto the base in front of the support and the through passage therefrom for holding the processed tree.

In operation, the felled tree which is usually picked up by the head, then pulled by the boom to the holding means, and subsequently processed by the head moved forwards by the boom while the tree is held by the holding means, may be repositioned with respect to this holding means by using the head to push the tree back through the passage in the support. This makes it possible to process trees even if their length is longer than the boom.

In accordance with a prefered embodiment of the invention, means maybe provided for selectively moving abutment means between an operative position behind the holding means and an inoperative position to the side of the holding means. Means can also be provided in the base, behind the holding means for guiding the tree through the base when the abutment means is in an inoperative position and the tree is being repositioned relative to the holding means.

In accordance with the other object of the invention, an improved tree processing unit is provided having a base and a boom movable through the base. The boom has an operating head at its front end carrying means thereon for use in processing trees. Means are provided for mounting at least two electrically conducting cables between the front and rear ends of the boom. The cables are preferably located above and to the sides of the boom and are electrically insulated from the boom. Means are provided for electrically connecting a source of electrical power from the base to the cables. Means are also provided at the front end of the boom for electrically connecting the cables to the operating head to operate at least one of the processing means carried by the operating head.

The means for electrically connecting the cables to the head to operate at least one of the processing means carried by this head may comprise at least one electrovalve for by-passing the hydraulic power supplied to at least one of the processing means carried by the operating head to another in order to operate it without having to supply said other processing means in a permanent manner.

A preferred embodiment of the invention will now be described in detail having reference to the accompanying drawings in which.

Figure 1:
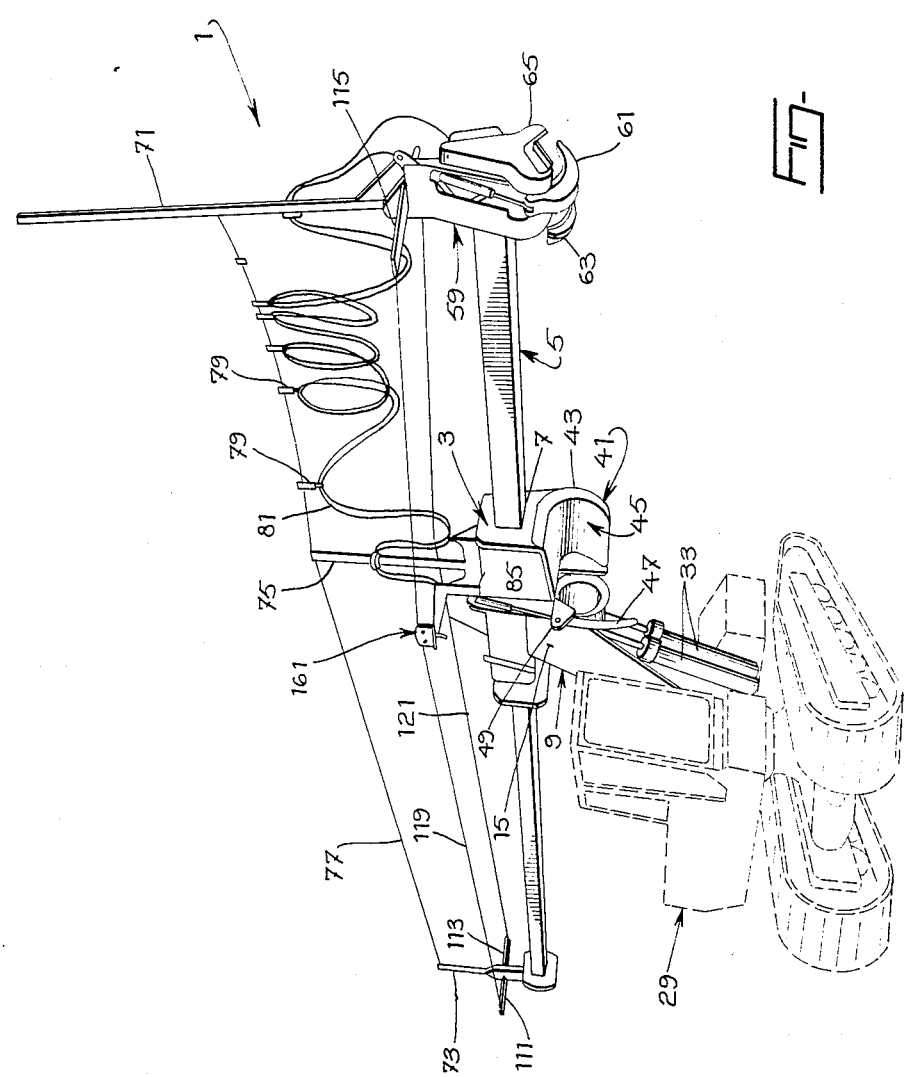
FIG. 1 is a perspective view of a processing unit mounted on a modified hydraulic excavator.

The processing unit 1 shown in FIG. 1 includes an elongated tubular base 3 and a rigid, elongated boom 5. The base 3 is of elongate, tubular form with a generally rectangular cross-sectional shape. The boom 5 is mounted on the base 3 through the longitudinal extending opening 7 in the base. Means (not shown) are provided for moving the boom 5 back and forth in the opening relative to the base 3. The moving means can be similar to those shown in the above mentioned Canadian Pat. No. 1,055,366.

Figure 2:
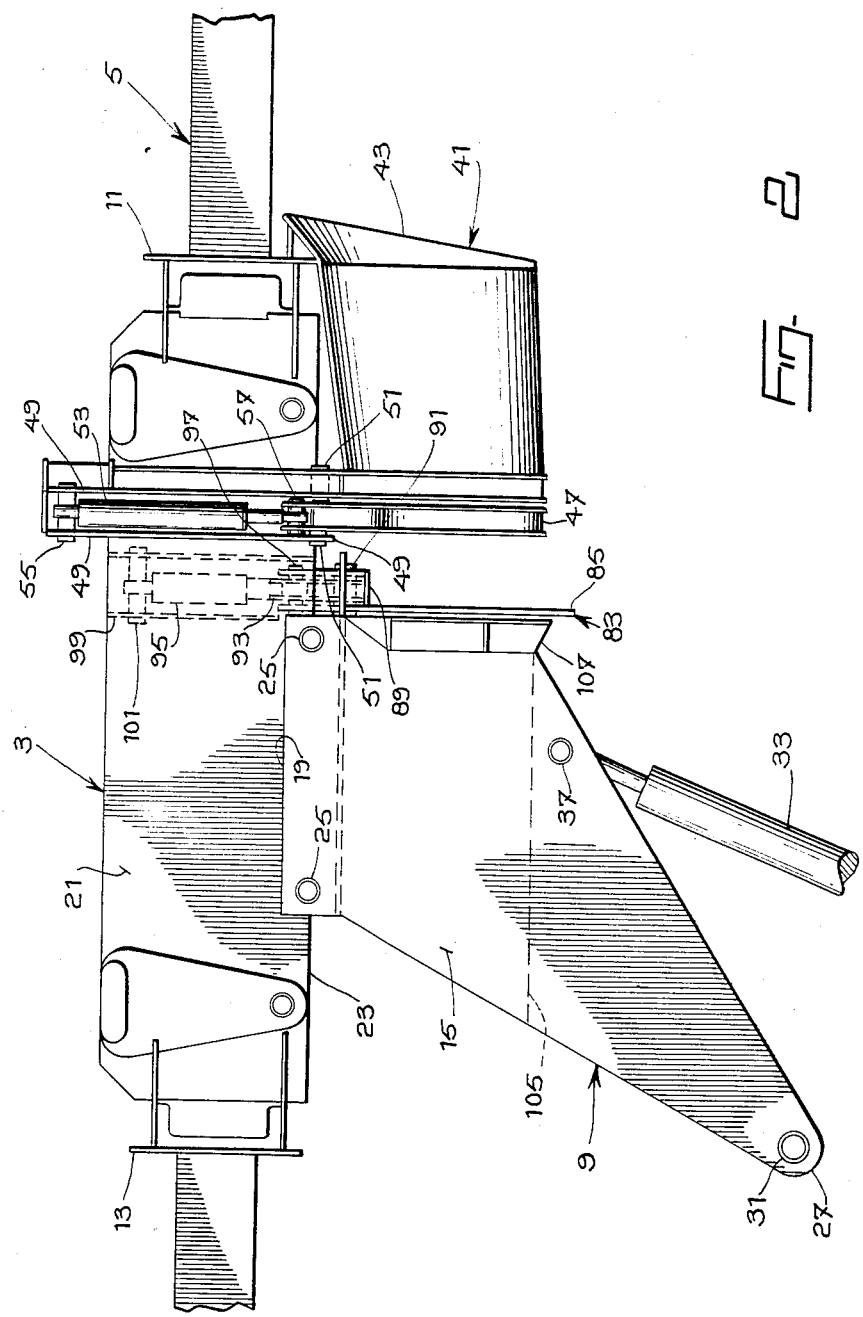
FIG. 2 is a detail side view of the base portion of the processing unit.
Figure 3:
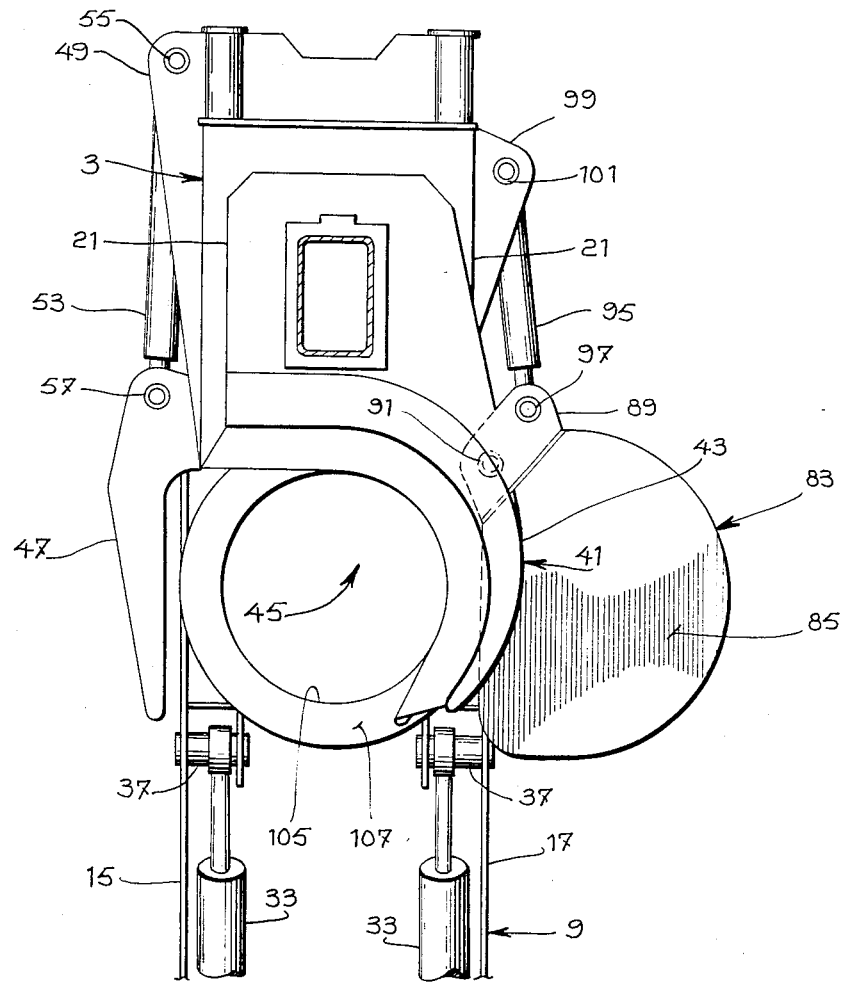
FIG. 3 is a detail end view of the base portion of the processing unit.

The base 3 is mounted on a support 9 intermediate its ends 11 and 13. The support 9 includes a pair of generally triangular shaped, spaced-apart side plates 15 and 17 as shown in FIGS. 2 and 3. The side plates 15 and 17 are parallel to each other define a through passage 45 between them. They are each fastened at their upper, wide end 19 to a side 21 of the base 3, adjacent the base bottom 23, by suitable fastening means 25. The lower, narrow ends 27 of the plates 15 and 17 are pivotably connected to a suitable mounting on the carrier vehicle 29 for the processing unit 1. The plates 15 and 17 can be connected to the vehicle 29 by suitable pivot means (not shown) passed through holes 31 in the ends 27 of the plates 15 and 17. Suitable braces (not shown) can extend between the plates 15 and 17 to provide a strong and rigid support 9. A pair of hydraulic actuators 33 extend between the carrier vehicle 29 and the top portion of the support 9. The actuators 33 are parallel to each other and are pivotably mounted at their lower end to the carrier vehicle 29 in front of the support mounting. The upper ends 35 of the actuators 33 are rotatably mounted on pins 27 projecting inwardly from side plates 15 and 17. The pins 37 are securely braced. Operation of the actuators 33 will pivot support 9 about the pivot means connecting it to the carrier vehicle thereby pivoting the base 3, carried by the support 9, and the boom 5 carried by the base.

Means 41 for holding a tree are fixed onto the base 3 in front of the support 9 and passage 45. These holding means 41 include a curved anvil 43 extending down from one side 21 of the base adjacent its front end 11. The anvil 43 is located in front of the support 9 and is curved slightly inwardly to provide a pocket 45 to receive a tree trunk. The holding means 41 includes a holding arm 47. The arm 47 is positioned on the other side of the base 3 from the anvil 43 and just rearwardly of the anvil. The arm 47 is pivotably mounted to a bracket 49 by a pivot pin 51. The bracket 49 is fixed on the side 21 of the base 3 and projects just below the bottom 23 of the base 3 as shown in FIG. 2. The arm 47 normally extends downwardly providing a space between it and the anvil 43 in which a tree trunk can be positioned. Means are provided for pivoting the arm 47 inwardly toward the anvil 43 to tightly hold the tree trunk between the arm and anvil in the pocket 45. The arm moving means can comprise a hydraulic actuator 53 pivotably mounted at its upper end by a pivot pin 55 to the top portion of bracket 49. The lower end of the actuator 53 is pivotably mounted by a pivot pin 57 to the arm 47 outwardly of the mounting of arm 47 to bracket 49 by pivot pin 51. Operation of actuator 53 will pivot arm 47 about pin 51 inwardly toward anvil 43.

The boom 5 carries an operating head 59 at its front end. The operating head 59 carries means for use in processing a tree. These processing means includes means 61 for gripping a tree, means 63 for debranching the tree, and means 65 for cutting off the top of the tree, at its front end. The gripping means 61 are used to position a tree so it can be held by the holding means 41 and then debranched by the debranching means 63 while so held.

The boom 5 has a mast 71 at its front end and a mast 73 at its rear end. A mast 75 also projects up from the top of the base 3. A cable 77 extends between the front and rear masts 71 and 73, passing slidably through the center mast 75 and spaced above the boom 5. Slidable hangers 79 are mounted on the cable 77 between the central mast 75 and the front mast 71. The hangers 79 carry a bundle 81 of hydraulic power lines from the base 3 to the front mast 71 to provide power from the vehicle carrier 29 to the gripping means 61, the debranching means 63, and the cutting means 65 at the front end of the boom 5.

In operation, the felled tree which is usually picked up by the head, then pulled by the boom to the holding means, and subsequently processed by the head moved forwards by the boom while the tree is held by the holding means, may be repositioned with respect to this holding means by using the head to push the tree back through the passage in the support. This makes it possible to process trees even if their length is longer than the boom.

If desired, the above described, processing unit may further comprise movable abutment means 83.

These movable abutment means 83 comprise a plate member 85 which can swing between an operative position just behind the anvil 43 and beneath the boom 5, and an inoperative position just to the side of the boom and the anvil. The plate member 85 has a generally oval shape with a flange assembly 89 on its peripheral edge. A pivot pin 91 connects the flange assembly 89, at one side thereof, to a bracket 93 on the side 21 of the base 3 opposite to the side carrying the holding arm 47. The plate member 85 is pivotably moved about pin 91 by a hydraulic actuator 95. One end of the actuator 95 is connected to the other side of the flange assembly 89 by a pivot pin 97. The other end is pivotably connected to a bracket 99, on the side of the base 3 above bracket 93, by a pivot pin 101. Operation of the actuator 95 moves the plate member 85 between operative and inoperative positions about pivot pin 91.

When the plate member 85 is in an operative position, directly behind the anvil 43, it provides an abutment against which the butt end of a tree can be located prior to holding and debranching a tree. If the tree being handled is longer than the operative length of the boom, the abutment plate 85 can be moved sideways to an inoperative position allowing the long tree to be repositioned by passing its butt end through the support 9, between the side plates 15. After repositioning, the tree is held again by the holding means 41 and the boom 5 is operated to finish debranching and topping of the tree.

To facilitate passage of the tree through the support 9, a tubular guide 105 may be mounted between the side plates 15 and 17 of the support 9. The tubular guide 105 is positioned just beneath the base 3 and just behind the anvil 43 and it may comprise a section of large diameter pipe or tube having an outwardly flared mouth 107 facing the anvil 43 to direct the tree into the guide 105. The abutment plate 85, when in the operative position, is closely adjacent, and overlies the mouth portion 107 of the guide 105. Thus, the guide 105 provides support for the plate 85 when the butt end of a tree is moved against plate 85.

In accordance with another feature of the present invention, the processing unit 1 may further be provided with novel means for use in electrically operating one or more of the tree processing units located at the front end of the boom. Electrical operation of one or more of the units is advantageous in that it allows substantial reduction of the size of the cable bundle 81 which presently is large and often awkward to handle because of its size.

Figure 4:
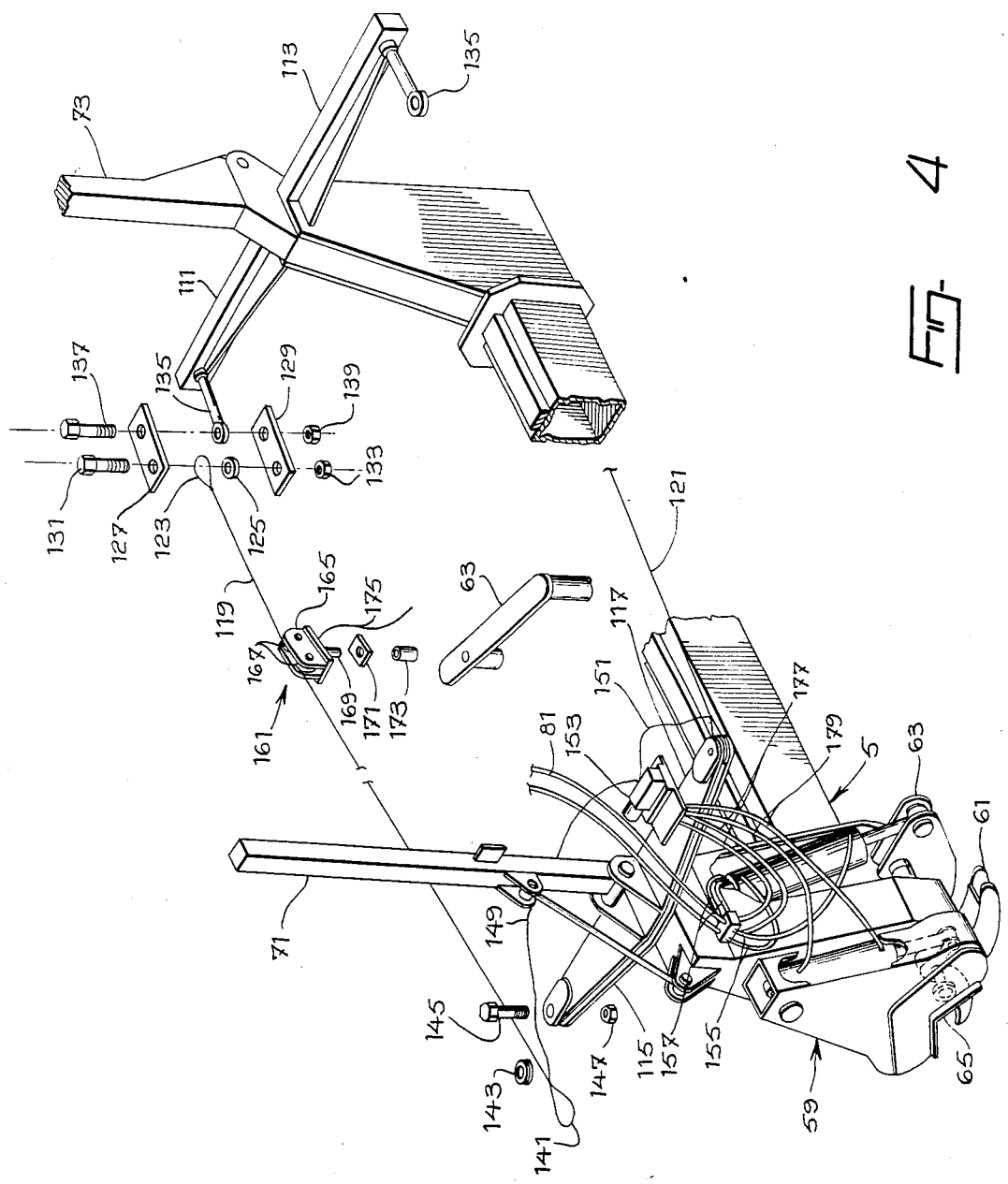
FIG. 4 is an exploded view of the cable support system for the boom.

As shown in FIG. 4, a first pair of arms 111 and 113 project laterally from the rear mast 73 in opposite directions and a second pair of arms 115 and 117 project laterally from the front mast 71 in opposite directions. A first cable 119 connects the ends of rear arm 111 and front arm 115 on one side of the boom 5 and a second cable 121 connects the ends of arms 113 and 117 on the other side of the boom. The cables 119 and 121 are generally parallel to each other and to the boom 5. The cables 119 and 121 help to strengthen the boom 5. More importantly however, the cables 119 and 121 are made of electrically conductive material to carry electrical current to the front end of the boom 5 from the base 3. To do so, the rear end 123 of each cable 119 and 121 is looped and mounted on an insulator ring 125 which is in turn mounted between a pair of brackets 127 and 129 by a bolt 131 and nut 133. The brackets 127 and 129 are mounted on a connector 135 projecting forwardly from the outer end of each rear arm 111 and 113 by a second bolt 137 and nut 139. The front end 141 of each cable 119 and 121 is also looped and mounted on an insulator ring 143 which in turn is mounted on the outer end of each front arm 115 and 117 by a third bolt 145 and nut 147.

The cables 119 and 121 may be directly connected by leads 149 and 151 leading from their front loops 141 to one of the tree processing units carried at the front end of the boom, such as, for example, the tree top cutting means 65 in order to electrically operate it. As shown in FIG. 4, these cables may, however, be alternatively connected to an electrovalve 153 mounted on the front arm 117, for by-passing the hydraulic power supplied to the head 59 via the cable bundle 81, from one of the tree processing units to another processing unit such as, for example, from the gripping means 61 and/or debranching means 63 to the cutting means 65 which does not need in practice to be supplied with hydraulic power in a permanent manner. As shown in FIG. 4 the gripping means 61 and debranching means 63 are hydraulically operated via two sets of cables 155 and 157 connected to the cable bundle 81, whereas the cutting means 65 is operated via two sets of short cables 177 and 179 extending from the bundle 81 to the electro valve 153 and from this electrovalve to the cutting means 65, respectively.

In operation, when actuation of the tree top cutting means 65 is needed, an electrical signal of, for example 30 Amps is triggered by the operator from his cab.

The so triggered signal is supplied to the cables 119 and 121 from the base 3 through two indentical roller connections 161, only one of which is shown. As shown in FIG. 4, each roller connection 161 includes a support arm 163 extending laterally out from the base 3. A metal bracket 165, carrying a pair of metal rollers 167, is mounted on the arm 163 by a post 169. The bracket 165 is insulated from the arm 163 by insulating mounting elements 171 and 173. An electrical lead 175 connects the bracket 165 to an electrical source via triggering means (not shown) located in the operator's cab. Operation of this triggering means causes the above mentioned electrical signal to be supplied to the brackets 165 and from there to the cables 119 and 121 via the rollers 167 no matter where the boom 5 is located relative to the base 3.

As soon as the electrical signal reaches the electrovalve 153, the hydraulic power supplied by the cable bundle 81 to the gripping means 61 and debranching means 63 is by-passed via the cables 177 and 179 to the cutting means 65 which is thus operated. This arrangement of course reduces the number of cable hanging over the boom 5 from the base 3 to the processing head 59 and makes the bundle 81 easier to handle.

I claim:

1. A tree processing unit to be used in combination with a motorized carrier, said unit comprising:
   a base support pivotably mounted on and extending up from said carrier, said support comprising a pair of spaced apart side plates parallel to each other, said side plates defining a through passage between them;
   an elongated, tubular base fastened to the upper ends of the side plates of the base support, said base extending above the through passage defined by the said side plates,
   a rigid, elongated boom movable through said base, said boom having a front end,
   a tree processing head fixed onto the front end of the boom for gripping and debranching a felled tree, and
   means fixed onto the base in front of the support and the through passage therefrom for holding the processed tree,
   whereby, in operation, the felled tree which is usually picked up by the head, then pulled by the boom to the holding means, and subsequently processed by the head moved forwards by the boom while the tree is held by the holding means, may be repositioned with respect to said holding means by using the head to push the tree back through the passage in the support in order to process said tree even if its length is longer than the boom.

2. The tree processing unit of claim 1, further comprising a tubular guide mounted between the side plates of the support.

3. The tree processing unit of claim 2, wherein the tubular guide is positioned just beneath the base and comprises a section of large diameter pipe having an outwardly flared mouth to direct the processed tree into the guide.

4. The tree processing unit of claim 1, further comprising abutment means mounted on the base and means for moving the abutment means between an operative position directly behind the holding means where it can intercept a tree being handled by the processing unit, and an inoperative position to the side of the holding means to permit movement of a tree being handled by the processing unit rearwardly of the holding means through the passage in support.

5. The tree processing unit of claim 4, further comprising means behind the holding means for guiding the tree in its movement rearwardly of the holding means through the support.

6. The tree processing unit of claim 5 wherein the guiding means comprises a tubular member fixedly mounted to the base beneath the same between the side plates of the support, said tubular member having an outwardly flared mouth facing the holding means.

7. The tree processing unit of claim 6 wherein the abutment means consists of a plate member pivotably mounted to the base adjacent the tubular member, said plate member overlying the mouth of the tubular member when in the operative position.

8. In a tree processing unit having a base, a boom movable through the base, said boom having a front end and a rear end, an operating head at the front end of the boom, said head carrying a plurality of hydraulically operated, tree processing means, and holding means on the base for selectively holding a tree being handled by the processing units, the improvement comprising means for mounting at least two electrically conductive cables between the front and rear ends of the boom, means for insulating the cables from the boom, means for electrically connecting an electrical source located in the base to the cables, and means for electrically connecting the cables to the operating head to operate at least one of the processing means carried by said head.

9. The tree processing unit of claim 8, wherein said means for electrically connecting the cables to the head to operate at least one of the processing means comprises at least one electrovalve for by-passing the hydraulic power supplied to at least one of the tree processing means carried by the operating head to another processing means in order to operate said other processing means without having to supply said other processing means in a permanent manner.

10. The tree processing unit of claim 8 wherein the means connecting the electrical source to the cables at the base comprise an electrically conductive bracket adjacent each cable, said bracket being mounted on the base and being insulated therefrom, at least one electrically conductive roller on said bracket riding on the cable and an electrical lead connecting the electrical source to said bracket.

11. The tree processing unit of claim 8, wherein the cables are mounted above and to each side of the boom, the cables being generally parallel to each other and to the boom, each cable at each end being mounted on the outer end of an arm projecting outwardly and above the boom, said cables strengthening the boom.

* * * * *